United States Patent [19]

Egosi

[11] 4,239,603
[45] Dec. 16, 1980

[54] FUEL-EFFICIENT GENERATION OF EJECTING STEAM

[76] Inventor: Dan Egosi, 7 Ben Gurion Blvd., Tel Aviv, Israel

[21] Appl. No.: 879,856

[22] Filed: Feb. 22, 1978

[51] Int. Cl.³ .............................. B01D 1/28; C02F 1/06
[52] U.S. Cl. .......................................... 203/11; 203/88; 203/DIG. 14; 203/DIG. 20; 60/648; 122/40; 159/2 R; 202/172; 202/202; 202/205
[58] Field of Search ............... 203/DIG. 14, DIG. 20, 203/DIG. 8, 11, 10, 88, 26, 24, 91; 60/641, 648, 618; 165/1; 202/205, 202, 172; 417/151, 76; 159/24 B, 2 R, 47 R; 122/40, 1 R

[56] References Cited

U.S. PATENT DOCUMENTS

| | | | |
|---|---|---|---|
| 2,280,093 | 4/1942 | Lleinschmidt | 203/26 |
| 2,441,361 | 5/1948 | Kirgan | 203/26 |
| 2,793,502 | 5/1957 | Riehl | 60/648 |
| 3,489,654 | 1/1970 | Geiringer | 159/24 B |
| 3,505,171 | 4/1970 | Grow | 159/24 B |
| 3,522,150 | 7/1970 | Galuska | 203/88 |
| 3,796,640 | 3/1974 | Boomer | 203/11 |
| 3,869,351 | 3/1975 | Schwartzman | 203/11 |
| 3,962,873 | 6/1976 | Davis | 60/641 |
| 4,023,946 | 5/1977 | Schwartzman | 203/26 |

*Primary Examiner*—Wilbur L. Bascomb, Jr.
*Attorney, Agent, or Firm*—Kenyon & Kenyon

[57] ABSTRACT

A fuel-efficient method and apparatus for the generation, actually re-generation, of ejecting steam used in a steam ejection system to evacuate process vapor from an enclosed space. In the method, all of the ejecting steam is not generated continuously in a boiler, but a predetermined quantity of steam is reused by continuous mechanical recompression, without intervening condensation, in a returning cycle while alternating between a pressure low after ejection (i.e. expansion) and a pressure high after recompression, whereas the evacuated vapor is branched off from the ejecting steam cycle after ejection and condensed. Parts of the condensate are reconverted to additional steam by heat exchange with all or part of the superheat and friction heat contained in the recompressed ejecting steam and-/or by heat exchange with the exhaust and cooling system of a heat engine serving as a prime mover for the compressor. This thermally generated additional steam either may be supplied to the outside as output steam or may be employed as additional ejecting steam. The average specific thermal input into the steam, consisting partly of recompressed and partly of thermally generated steam, amounts to roughly 50% of the analogous specific thermal input in prior art.

26 Claims, 4 Drawing Figures

Version A

Fig. 1  Version A

Fig. 2  Version B

Fig. 3  Version C

Fig. 4  Version D

FUEL-EFFICIENT GENERATION OF EJECTING STEAM

BACKGROUND OF THE INVENTION

1. Field of the Invention

The present invention relates to steam ejection systems and specifically to methods and apparatus for the thermally efficient regeneration of steam used in ejection systems.

2. Description of the Prior Art

Ejectors are widely used in industrial processes, such as vacuum flash cooling and vacuum drying, to remove aqueous liquid, in the form of vapor, from a process stream in an enclosed chamber. The steam ejector consists of a steam nozzle for discharging a high velocity jet of steam across a suction chamber connected to an enclosed flash evaporation space from which process vapor is to be removed. The evacuated vapor is entrained in the high velocity steam jet in a converging mixing section, and the mixture then passes through a diverging diffuser section where the mixed stream is thermo-compressed to the exit pressure of the ejector.

In prior art ejection systems, the ejecting steam is generated in a fuel-fired boiler, either expressly for the ejection system or for use in a turbine for generating power prior to its delivery to the ejection system. In either case, the mixed stream of exhausted ejecting steam and process vapors exiting from the ejector outlet is condensed in a condenser fed by ambient cooling water.

The pressure at which ejecting steam is supplied varies widely over the range roughly from 0.5 to 30 bars, depending on the ejection process and the source of the steam. Secondary steam from a power generating means tends to be at the lower end of the range.

Normally, part of the condensate, equal by weight to the mass flow rate of ejecting steam delivered to the ejector, is rerouted through a condensate pump back to the boiler as makeup feedwater. The remainder, which is equal to the mass flow rate of process vapor evacuated from the evaporation chamber, is usually rejected from the process.

For example, a typical ejection system may use, as a working fluid, dry saturated steam at an initial pressure of 2 bars and a corresponding specific enthalpy of 646 kilocalories per kilogram (kcal/kg). A typical condenser temperature is 33° C., which corresponds to a specific enthalpy of 612 kcal/kg for the mixture leaving the steam ejector. Consequently, an enthalpy drop of 34 kcal (646−612=34) occurs during the work doing expansion of one kg of ejecting steam in the ejector.

Since the specific heat of the condensate at 33° C. is 33 kcal/kg, the heat rejected to the condenser coolant is 579 kcal (612−33=579) for each kilogram of ejecting steam that is condensed. All of this heat must be restored to the condensate recycled to the boiler in order to generate one kilogram of saturated steam at 2 bars. Assuming a boiler thermal efficiency of 0.90, the actual heat energy input per kilogram of generated steam is (646−33)/0.9=681 kcal. Of this amount, approximately only 5% (34 kcal/kg) is employed in the work-doing enthalpy drop during expansion in the ejector, meaning that the remaining 95% represents total waste.

Because of the rapidly escalating cost of fuel, it has thus become imperative to improve the fuel-effectiveness of conventional ejection systems.

SUMMARY OF THE INVENTION

In general terms, the method of the present invention includes:

In combination with a process employing steam ejection that includes inflowing an aqueous substance into a flash evaporation means for vaporizing water from the substance, discharging the substance remaining after said vaporization, supplying ejecting steam at a first pressure and a first enthalpy level to ejector means operatively connected to the flash evaporating means for creating and maintaining an under-pressure in said flash evaporation means and for evacuating and subsequently thermo-compressing the vaporized water from the flash evaporation means to a second pressure and second enthalpy level lower than the respective first pressure and first enthalpy level, a method for the continuous regeneration of ejecting steam, the method comprising:

(a) employing a predetermined quantity of ejecting steam in a returning conduit including said ejector means;

(b) expanding said ejecting steam in said ejector means to said second pressure and second enthalpy level;

(c) recompressing said expanded ejecting steam with mechanical compression means to its initial first pressure and an enthalpy level at least equal to said first enthalpy level;

(d) repeating steps (b) and (c) in a continuous cycle, whereby the predetermined quantity of ejecting steam is continuously regenerated without condensing it and without using a boiler to regenerate it;

(e) branching off from the flow of steam/vapor mix exiting from the ejector means that part of the flow which is in excess of the initial recompressed ejecting steam flow, leaving thereby the predetermined quantity of ejecting steam flow for the continuous implementation of steps (b) and (c); and (f) condensing the branched-off flow.

Additional steps for the method of the invention may include:

(g) extracting sufficient superheat and friction heat generated during the mechanical recompression of the ejecting steam to reduce the enthalpy of the predetermined quantity of steam after step (c) to the first enthalpy level and thereby establishing a first output source of heat;

(h) driving the mechanical compression means with a heat engine;

(i) retrieving the reject heat of the heat engine's cooling system at maximal temperature, thereby establishing a second output source of heat; and (j) recovering the waste heat contained in the heat engine's exhaust gases by means of an exhaust boiler, thereby establishing a third output source of heat.

The three output sources of heat may be used separately or together in processes outside the ejecting steam process, or they may be combined to produce ejecting steam in addition to the predetermined amount of recompressed ejecting steam.

Apparatus for implementing the method of the invention includes:

In combination with a system employing steam ejection, the system including a flash evaporation means for vaporizing water from an aqueous process substance, the flash evaporation means having an inlet for an aqueous process substance, a first outlet for water vapor evaporated from the process substance and a second outlet for discharging the remainder of the process substance, and an ejector means for creating and maintaining an under-pressure in said flash evaporation means and for evacuating and subsequently thermo-compressing the vaporized water from the flash evaporating means, the ejector means having an ejecting steam inlet, an evacuated vapor inlet connected to the first outlet of the flash evaporation means, and an outlet for the mixture of exhausted steam and thermo-compressed evacuated vapor, apparatus for continuously regenerating ejecting steam employed in said system, the apparatus comprising:

(a) conduit means connected in a returning loop between the outlet of the ejector means and the ejecting steam inlet of the ejector means for circulating a predetermined quantity of ejecting steam in one direction between an initial pressure level before ejection and an exhaust pressure level, the ejector means being located at a pressure drop zone in the ejecting steam loop between the two pressure levels;

(b) distribution means placed in the conduit means downstream from the outlet of the ejector means for dividing the exhausted steam/evacuated vapor flow into two streams, the first composing the predetermined quantity of circulating ejecting steam and the second composing the remainder of the flow from the outlet of the ejector means;

(c) mechanical compressor means located at a pressure increase zone in the ejecting steam loop between the two pressure levels for recompressing said first stream to its initial pressure before ejection; and (d) condenser means connected to the dividing means for condensing the vapor in the second flow.

Additional features of the apparatus of the invention may include:

(e) heat exchange means placed downstream from the compressor means, for the transfer of the superheat and friction-heat generated during compression into a heat carrier in heat-transfer relationship with the outside, comprising a first output source of heat;

(f) prime-mover means embodied by a heat engine for driving the compressor means;

(g) retrieval means for the reject heat of the heat engine's cooling system, in heat exchange relationship with the outside via a returning cycle, comprising a second output source of heat;

(h) exhaust boiler means for the retrieval of the waste heat contained in the exhaust gases of said heat engine, comprising a third output source of heat;

(i) accessory and control means; and (j) insulation means to cover all parts of the apparatus.

GENERAL DESCRIPTION OF THE INVENTION

Many kinds of compressors may be employed for the process of the invention. However, turbo-compressors are most suitable, with axial types taking preference by reason of their higher efficiency, larger volume handling capability and better adaptability for superheat and friction heat extraction in very small stages. To minimize fuel consumption, care must be taken to completely insulate the compressor/prime mover combination, as well as all fixtures such as ejectors and conduits, against the escape of heat.

Theoretically, adiabatic mechanical compression of the steam causes its temperature to rise not merely to the temperature corresponding to saturated steam at ejection pressure, but considerably higher to a level in the superheat range. For example, the temperature may reach 200°–400° C., depending on the compression ratio. In addition, part of the compressor work is transformed by way of friction and tubulence into additional heat, depending on the compressor's mechanical efficiency. The resulting final temperature, therefore, will be even higher than that predicted for adiabatic compression to the output pressure since the superheat and the friction heat are superimposed on each other.

Generally, the use of superheated steam for steam ejection is more efficient in the process of this invention than in prior art because superheated ejecting steam which is able to provide an equal work doing enthalpy drop across the ejector as saturated steam requires a much smaller compression ratio for its recompression, and correspondingly less fuel input.

Any superheat above the level predetermined for the ejecting steam may be either delivered to the outside—comprising the first source of output heat—or converted to additional ejecting steam. Alternatively, generation of excess superheat during compression may be held in check up to a certain extent, as detailed further below. The decision which one of these alternatives to employ is largely a matter of process requirements, not only of the ejecting steam generating process but also of the wider system within which said ejecting steam generating process operates.

Since the present invention makes a fuel-fed boiler unnecessary, this advantage would be lost if the wider system requires a boiler in any event for its additional production steps. Therefore, if the requirements for superheat in the ejecting steam are complied with, but the other heat output sources of the invention are not able to satisfy the additional requirements of heat by the wider system, the first source of output heat may be needed to supply those additional requirements.

If, on the other hand, the requirements for superheat in the ejecting steam and the additional requirements of the wider system are met, and there is still excess superheat available, its rate of generation can be minimized, or the excess superheat can be converted into additional ejection steam.

The decision to enhance, minimize or convert the superheat output is based on the following considerations:

First, the process requires a larger input of compression work to arrive at the desired ejection pressure if the starting temperature of any compression stage is higher than the temperature corresponding to the pressure of saturated steam at the start. In other words, the presence of superheat, including friction heat superimposed on it, at the start of any compression stage, causes the generation of still more superheat to result in a potentially far higher specific superheat content at the end of the stage.

Therefore, if the heat output of the first source is to be maximized, the superheat/friction heat should be extracted after the steam leaves the compressor, but still prior to ejection. The heat extraction may be carried out by means of surface heat transfer, preferably in counterflow, between an extracting medium, at an appropriate flow rate, and the ejecting steam.

On the other hand, if the output of the first source is to be minimized, the superheat/friction heat should be extracted by heat exchange means at several stages during compression. Each heat transfer device preferably operates in counterflow, and the extracting medium travels, at an appropriate flow rate, in the direction of compression, from one device to the next, thereby achieving the maximum temperature under given conditions, with a minimum spread of heat.

As a further possibility, if there is excess superheat, it need not be extracted by means of surface heat transfer. Instead, an appropriate amount of condensate may be sprayed into the superheated steam in a fashion known in the art as de-superheating, in a special chamber located downstream from the compressor. The fine mist of sprayed-in condensate absorbs superheat and evaporates, thereby converting sensible superheat into latent heat of evaporation by direct contact. This alternative procedure generates additional ejecting steam from the higher strata of superheat. Caution must be exercised, however, to control the condensate feed rate so as not to fall below the desired superheat level for the ejecting steam, or, if all the superheat is to be extracted, not to fall below the saturation level, so as not to incur a loss of pressure.

In order to save compression work, de-superheating can be carried out during compression at many points which are progressively arranged along and around the compressor's shell, in a manner similar to that previously described. It should be understood that the addition of ejecting steam by this procedure is tantamount to an appropriate reduction of the size of the compressor, because the added thermally generated quantity of ejecting steam is condensed together with the evacuated vapor and not recompressed.

In surface heat exchange, various kinds of heat transfer devices may be employed, such as fire-tube boilers, water-tube boilers and strict counter-flow designs of both former kinds.

Several types of heat extracting media may be used, for example, pure aqueous carriers, commercial heat transfer fluids, non-volatile heat-resisting oils, solutions with high boiling point elevations, molten salts, air, and so forth.

Pure aqueous carriers may selectively transport the heat either in the form of steam or in their liquid state. Since the maximum temperature of the compressed superheated steam may exceed the critical temperature of steam (374° C.), it is possible, in counterflow and at appropriate relative flow rates, to generate saturated output steam of up to supercritical pressure.

In superheat extraction by either surface heat transfer or direct contact de-superheating, it is of general advantage to preheat the heat carrying medium, at least partially, either by the lubricating oil cooling system or the body cooling system, or both, of a heat engine driving the compressor.

In principle, other kinds of prime movers than heat engines, such as engines driven by falling, flowing, or moving water or by wind also are suitable as compressor prime movers; though some may require various procedural changes in the process.

Regarding heat engines, the choice is not based on fuel effectiveness (thermal efficiency) as the sole criterion for suitability, although this is the primary consideration in most cases. Other considerations are the temperature level at which the engine disposes of its reject heat and the extent to which said heat, both from body cooling and from exhaust gases, can be reclaimed for generating additional ejection steam or for other purposes outside the ejection system. Still another consideration is whether the temperature of the reject heat can be regulated and maximized without detracting from the efficiency of the engine.

The stationary diesel engine, as one example, possesses the required properties. Its overall efficiency is as high as 0.40 (40%); its cooling system provides a heat output of about 30% of the thermal equivalent of the total fuel input, at a temperature of 100°–120° C.; while the heat contained in the exhaust gases comprises about 25% of the total, at a temperature level of 250°–500° C. Thus, only about 5% of the total heating value of the fuel is not recoverable. Other stationary heat engines, such as gas turbines and the Stirling engine may be equally suitable.

The Stirling engine, for instance, is thermally as efficient as the diesel, while its reject heat, both from exhaust gases and from working fluid cooling, can be exploited at a temperature of roughly 250°–300° C. As an external combustion engine, the Stirling engine possesses the added advantage that it does not need oil but runs on almost any fuel.

The permissible maximal temperature for the engine cooling system varies with the kind of heat engine. In a diesel, for instance, a top temperature of 120° C. is considered acceptable. In the simplest embodiment of the invention, identified as Version A and described in the following sections, the hot cooling water itself serves as a heat carrier at atmospheric pressure or at a pressure corresponding to the permissible maximal cooling temperature—representing the second source of output heat.

After delivering its heat to the outside, the cooling water, still under its initial pressure, is returned to cool again. If a heat exchange fluid is substituted for the cooling water, the adjustment of permissible top temperature can be implemented by thermostatic control of the flow rate instead of by pressure.

In more advanced embodiments of this invention, identified as Versions B, C, and D and described in the following sections, the temperature of the relatively low-grade heat given off by the cooling water is enhanced so as either to equal the other sources of output heat, if so desired, or even to exceed it. In these embodiments the engine cooling system operates either at atmospheric pressure or slightly higher. In a diesel engine, for example, the cooling system may operate at a pressure of 2 bars, thus achieving a top temperature of 120° C., as mentioned above.

The hot cooling water is introduced into a flash evaporation chamber which is maintained at a lower pressure so that an appropriate part of the cooling water will flash off as steam at the lower pressure. This steam, generally at a pressure in the range of 0.6 to 1.5 bars, is then compressed to superheated steam of a desired higher pressure by a second compressor driven by the prime mover. The flash-cooled remaining cooling water is returned to cool the engine again at its initial higher pressure, while the flashed off cooling water quantity is continuously replaced either by part of the condensed vapor from the ejection system or by new cooling water.

Alternatively, the second compressor can be replaced by the main compressor in such a way that the vapor from the flash evaporation chamber is introduced, eventually with the aid of an impeller, into the main compressor at a point where the pressure attained in the main compressor equals, or is near to, the predetermined under-pressure in the flash evaporation chamber. Preferably, such a common pressure point could be an interim heat extraction stage point, even when interim heat extraction is not carried out, so as not to have to develop special compressors.

The flow rate of the cooling water through the engine cooling system and the pressure drop at flash evaporation, both in combination, should be adjusted so that as much latent heat of vaporization is transferred into the flashed off steam per time unit as sensible heat is rejected by the engine into the cooling water, so that a thermal equilibrium is maintained at any one time at the highest permissible cooling temperature and so that the prime mover will operate at its ultimate efficiency at full load.

Alternatively, the heating capacity of an appropriate part of the engine cooling system, prior to flash evaporation, as well as the heating capacity of all of its lubricating oil cooling system, may be used advantageously for preheating the heat transfer medium for the first source of output heat, mentioned above, either to the highest attainable temperature under given conditions or to the highest ejecting steam temperature, whichever is lower, prior to using the medium in surface superheat extraction or in de-superheating.

In that way, the engine cooling systems for lubricating oil and body, which constitute relatively low temperature sources, will sustain and enhance the thermal output of superheat extraction, which represents a relatively high temperature output source. In addition, the remaining volume of required engine body cooling is reduced accordingly, which makes it possible to reduce correspondingly the size of the flashing-off/compression operation.

Recovery of the reject heat from the exhaust gases of the compressor prime mover—representing the third source of output heat—may be carried out by means of a commercially available exhaust boiler or, preferably, by means of a heat transfer device operating in counter-flow, so as to achieve not only maximal heat recovery down to almost ambient but also a maximal temperature under given conditions, up to almost the temperature of the exhaust gases as they emerge from the engine.

The same heat carriers mentioned above as suitable for the first source may be used as heat recovery media in the exhaust gas heat exchanger. For example, pure aqueous carriers may selectively transport the heat either as steam or in the liquid state. Depending on the relative flow rates and on the highest temperature of the exhaust gases, steam of up to supercritical pressure may thus be generated by many kinds of heat engines.

The prime mover/compressor combination restores the pressure of the ejecting steam and thus its corresponding enthalpy to the initial ejection level. This means that in an ideal loss-free process, the combination does work equal to the enthalpy drop occurring during expansion of the steam in the ejector. Referring to the working example given above for the prior art, only 34 kcal would then be required to regenerate 1 kg of ejecting steam, as opposed to 613 kcal/kg in the prior art.

In practice, of course, the mechanical and thermal efficiency of the prime mover and the mechanical efficiency of the compressor have to be taken into account, as well as the fact that, inevitably, superheat is generated during compression. However, since the present process recovers those otherwise losses in the form of heat at a temperature suitable for industrial use and, where this is not possible, enhances their temperature to an adequate level, or, alternatively, employs the collected heat within the regeneration process—which prior art cannot and does not do—those liabilities are turned into assets, with the exception of a certain marginal percentage of lost heat, which is not larger than in any other efficient industrial heat generating process.

In prior art, as mentioned above, thermo-compression is implemented only to the extent that just enables the vapor to be condensed by ambient condensing water; whereas the present invention has as an object the thermo-compression of the ejecting steam to a higher exhaust pressure, thereby reducing the compression ratio remaining for mechanical compression. Since the specific volume of steam decreases with increasing pressure, and corresponding temperature, smaller compressors are then required.

For example, the specific volume of vapor at 30° C. and a corresponding pressure of 0.042 bar is almost 33m$^3$/kg, while at 40° 1 C. and 0.073 bar it is only 19.5 m$^3$/kg. Assuming, for instance, an ejecting steam pressure of 2 bars, the relevant compression ratios are 2/0.042=47.6 times for 30° C. and 2/0.073=27.4 times for 40° C., respectively. The comparative compressor size factor, expressed as the product of compression ratio and intake volume, is 42.6×33=1571 for 30° C., and 27.4×19.5=534 for 40° C., respectively. Hence, the compressor size decreases by a factor of almost 3 for a rise of only 10° C. in the relevant exhaust pressure range.

However, because steam consumption (defined as kgs ejecting steam per kg ejected vapor) rises not linearly but exponentially with increasing ejector exit pressure, attempts to raise the exhaust pressure above a certain level will become self-defeating. The optimal level is found in that range wherein the product of the annual expenditure for capital invested for the equipment and the annual cost of fuel attributable to the thermal generation and recompression of ejecting steam is a minimum, for a given flow rate of evacuated vapor.

There are several alternative ways to achieve a higher exhaust pressure for the ejecting steam:
(a) Use two ejectors or ejector groups for each evacuation chamber. One ejector delivers the vapor flow into the condenser at an exhaust pressure determined by the temperature of the condensing water, while the second ejector, or group, serves the ejecting steam flow at a higher exhaust pressure, which is achieved by way of employing either higher superheated ejecting steam or higher pressured steam or more steam per vapor flow rate than otherwise up to a certain optimal level beyond which their employment would become self-defeating as it would add on to the one side what is deducted from the other.
(b) Operate as in the former paragraph, but with the second ejector being a two-stage ejector wherein the second stage evacuates the exit of the first stage. This option is able to raise the exit pressure to a larger extent than the others.
(c) Use a multi-stage evacuation system in such a way that the vapor/steam mix from the lower stages makes up the part which is condensed, while the higher stages provide the vapor/steam mix for the uncondensed portion at higher exit pressure.
(d) Employ a combination of two or more of (a)-(c).

The employment of superheated steam, as mentioned above in paragraph (a) has an additional advantage in that superheated steam of the same ejecting capability, possesses a far lower pressure. Thus, compression work may be saved.

To start up the steam regenerating system of the present invention, either initial ejecting steam is supplied from an outside source, or the air already in the system may be compressed and used for ejection. As the air is recycled through the compressor and the ejector, it becomes mixed with more and more vapor from the evacuation chambers, until the vapor gradually replaces all the air, which is rejected from the process.

DETAILED DESCRIPTION OF THE PREFERRED EMBODIMENTS

Figure 1:
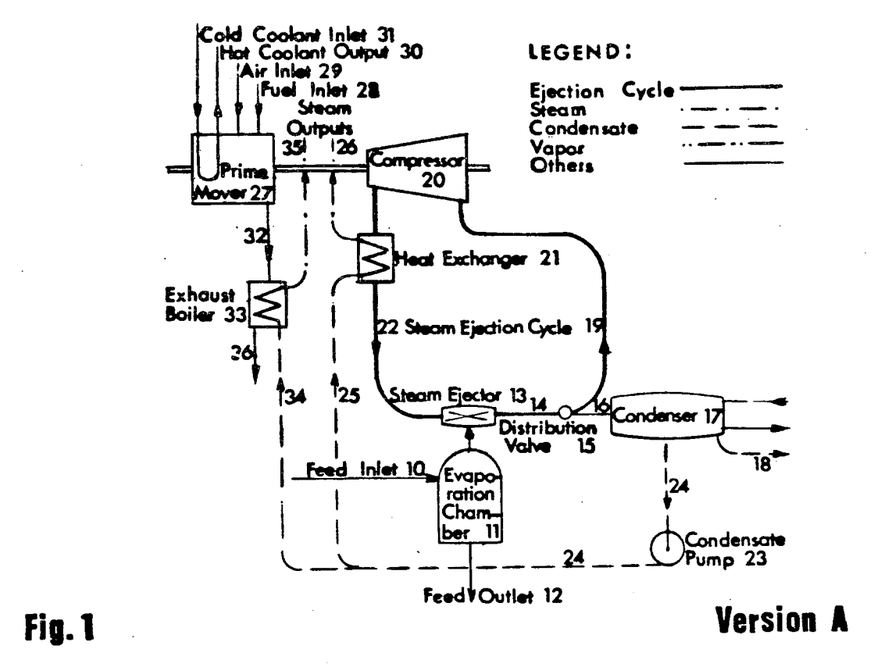
FIG. 1 is a schematic diagram of Version A of the invention in which all the ejecting steam is recompressed and the output heat is delivered at essentially the same temperature levels as it happens to be generated, that is, without making an additional effort in work or investment in equipment to regulate or to intensify that part of the output which is below approximately 120-150° C.

In FIG. 1, which illustrates Version A of the invention, an aqueous fluid is introduced by way of conduit 10 into flash evaporation/evacuation chamber 11. This chamber can be regarded as part of a wider process of which the present invention represents a subprocess. Since the invention is concerned only with ways and means to generate ejecting steam at an improved fuel efficiency, the nature of the wider process is not important. For example, the process may be vacuum cooling, liquor or juice concentrating, drying, or simply evacuation and/or rejection only.

In FIG. 1 only one chamber is shown, i.e., a single stage operation, but a multi-stage arrangement can be used if desired, exactly as in prior art.

The cooled and concentrated liquor leaves the chamber by way of outlet 12, while the flashed-off vapor is evacuated from the chamber by steam ejector 13. The suction force is created by means of a steam jet crossing in the ejector at the high velocity of 1-3 Mach, depending on the pressure drop in the ejector. The vapor particles are drawn into the vapor inlet of the ejector, entrained in the jet and subsequently thermo-compressed together with the steam particles of the ejecting steam. The ejector is chosen so that the condensing temperature will be approximately 10°-15° C. above ambient.

The ejected vapor/ejecting steam mix leaves ejector 13 through conduit 14 at a mass flow rate equal to the sum of the two individual initial mass flow rates of the steam and the vapor. A distribution means, such as valve 15, divides the mixture into two streams, a recycled first stream and a branched-off second stream.

The second stream, having a mass flow rate equal to the ejected vapor flow, proceeds through conduit 16 to be condensed in condenser 17. Part of the condensate is reused in the process, and the remainder, if any, is rejected through outlet 18. The first stream, having a flow rate equivalent to the mass flow of the ejecting steam at its initial flow rate, proceeds through conduit 19 to turbo-compressor 20.

In turbo-compressor 20 the steam is recompressed to its initial pressure before ejection, which pressure may be in the range of roughly 0.5-20 bars. The lower end of this pressure range is preferred, so as to have to overcome a smaller compression ratio. During compression the specific enthalpy of the steam will rise above the enthalpy level corresponding to saturated steam at the output pressure, assuming approximately adiabatic compression. The rise in enthalpy depends on the compression ratio overcome, and the generated superheat may reach a temperature level of 200°-400° C. approximately. In addition, the specific enthalpy rises further because part of the work input from the prime mover is transformed by friction and turbulence into heat, the amount transformed depending on the mechanical efficiency rate of the compressor.

In the embodiment of FIG. 1, the friction heat and superheat are extracted after compression in a counterflow heat exchange device 21 placed on ejecting steam conduit 22.

A preferred heat extracting medium is condensate, supplied at an adequate flow rate, either at a pressure high enough to make sure that the condensate will not start to boil at the temperature reached in heat transfer, unless the temperature attained is higher than the critical temperature of steam (374° C.) where no liquid state exists, or under a pressure adjusted to correspond to a boiling temperature lower than the maximally attainable one, in order to generate steam of the adjusted pressure.

The condensate is supplied from condenser 17 by means of pump 23, is delivered in counterflow to heat exchange device 21 by way of conduits 24 and 25 and is then delivered to an outside system by way of conduit 26, either as steam or as liquid, as desired.

Alternatively, instead of condensate, heat exchange fluids, non-volatile oils, air, or aqueous carriers, other than condensate from this process, can be used either in intermediate cycles or straight from the outside (not shown). These alternate heat exchange media would then come in alongside conduit 26, but from the opposite direction.

In FIG. 1, the ejecting steam leaves heat exchange device 21 as saturated steam and proceeds through conduit 22 to ejector 13 for repeated ejection. Conduits 14, 19, and 22 together form a loop wherein the ejected steam circulates continuously, alternating between a minimum pressure point, inside the ejector, and a maximum pressure level, at the exit from compressor 20 and along route 22.

As an alternative to extracting the superheat after compression, the extraction can be carried out during compression (not shown) in a manner known in the art of compressing as interim heat extraction. This will save compressor work otherwise required to reach the desired ejection pressure, but the heat yield then will be at lower temperature.

In interim extraction, the partly compressed steam is taken out of the compressor at at least one interim stage to be heat exchanged with a suitable extraction medium, quite similar to the manner and to the means described above for extraction after compression, and is then reintroduced for further compression and eventual further interim extraction and so on up to a final extraction after compression.

Compressor 20 is driven by a prime mover 27, preferably a heat engine having fuel and air inteakes 28 and 29, respectively. Engine coolant leaves through line 30 at its hottest state and returns, recooled from heat exchange with the outside, through line 31 to be used again for cooling.

Exhaust gases leave the engine via conduit 32 and enter into an exhaust boiler 33 to transfer their heat in counterflow to a heat extracting medium. This medium may be supplied either from the outside (not shown), or from inside the system, using part of the condensate from the condesser for that purpose. If supplied from the outside, the heat extracting medium can be any of the media previously described in connection with heat exchanger 21.

The condensate is supplied to exhaust boiler 33 through lines 24 and 34 and leaves by line 35 for the outside. The outside carriers mentioned above would arrive alongside line 35 but in reverse direction (not shown), whereas the cooled exhaust gases are rejected via line 36.

Depending upon the boiling temperature chosen in exhaust boiler 33 and in friction heat/superheat transfer device 21, and depending on the individual flow rates and pressures of the condensate in both devices, all the output heat from both sources can be delivered, either in the liquid state or as steam, at the same temperature level.

Figure 2:
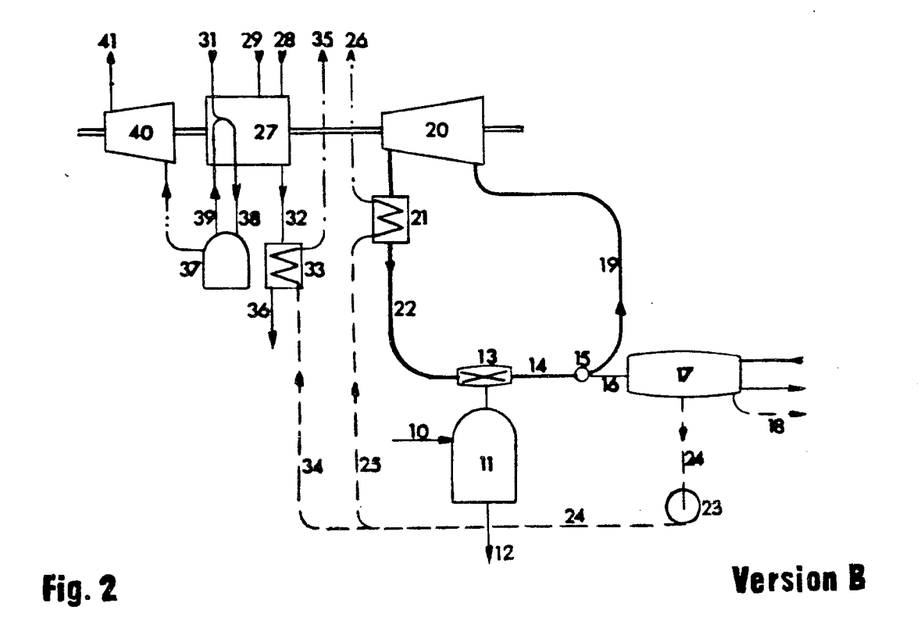
FIG. 2 is a schematic diagram of Version B of the invention wherein all the ejecting steam is re-compressed, as above, but the lower output heat is brought up to higher temperature too.

In FIG. 2, which shows Version B of the invention, once again an aqueous fluid is introduced into evacuation chamber 11, the flashed-off vapor is evacuated by means of steam ejector 13, an appropriate part of the ejected vapor/steam mix is condensed in condenser 17, while the remaining part, equal to the initial ejecting steam flow is recompressed to the initial ejecting steam pressure in turbo-compressor 20. Also as in FIG. 1, the superheat is extracted from the recompressed ejecting steam in heat exchange device 21 and is delivered to the outside. Compressor 20 is driven by prime mover 27, the exhaust gases of which heat condensate delivered through line 34 in exhaust boiler 33. The heated condensate is delivered to the outside via line 35 as hot water or steam.

In Version B, however, the cooling water from the engine is not in direct heat exchange relationship with the outside at the cooling system's relatively low reject temperature, as in Version A. Instead, the cooling water is converted to superheated steam of any desired temperature, up to roughly 400°–450° C. as a practical limit.

The engine cooling system operates either at atmospheric pressure or, where the system permits a cooling water temperature higher than 100° C., at a pressure corresponding to said higher temperature. The hot cooling water, at its highest permissible temperature, is introduced into flash evaporation chamber 37 by way of conduit 38. Chamber 37 is maintained at a pressure somewhat lower than the pressure of the cooling water in the engine, so that an appropriate part of the cooling water will flash off as steam. This steam is then compressed by second compressor 40 to superheated steam of specified parameters and is delivered to the outside by conduit 41.

The remaining cooled cooling water is routed back to prime mover 27 through line 39, by means of the coolant system circulation pump (not shown) at the initial higher pressure. The flashed-off cooling water quantity is replaced by new cooling water via inlet 31 at the same mass flow rate as steam is evacuated by compressor 40. Second compressor 40, which is driven by main prime mover 27, keeps the pressure in flash evaporation chamber 37 at the specified level.

By choosing a uniform and suitable pressure for the various heat generating features of the process, it is possible to collect all heat outputs of Version B into one unified steam supply system.

Figure 3:
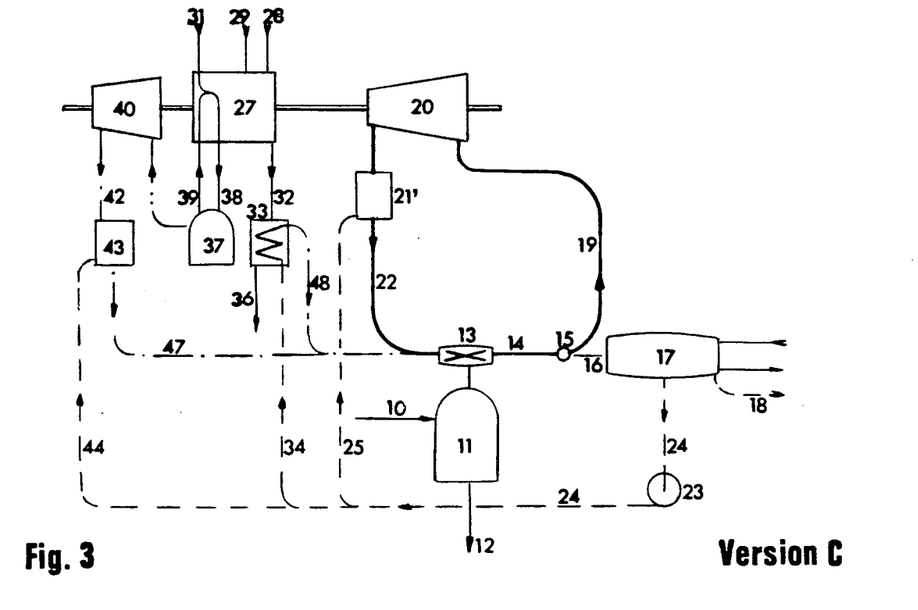
FIG. 3 is a schematic diagram of Version C of the invention, in which heat is not transferred to the outside but all of it is converted to ejecting steam, so that part of the ejecting steam derives from recompression and part from thermal generation. In addition, means are provided to reduce the size of the prime mover/compressor combination by raising the intake pressure into the main compressor, and by employing superheated ejecting steam of an enthalpy which will give the same work doing enthalpy drop as saturated steam, so that a smaller compression ratio has to be overcome.

In FIG. 3 which illustrates Version C, the operation of Version B is repeated, but with the following functional changes:

(a) all heat generating features are adjusted to generate superheated ejecting steam of predetermined parameters;

(b) all output sources of heat are connected to supply steam not to the outside but to the steam ejector;

(c) friction heat/superheat extraction by means of surface heat exchange is replaced by de-superheating.

In accordance with these changes, the surface heat exchange device 21 of Versions A and B is replaced by a de-superheating chamber 21', wherein no heat exchange surfaces are employed. The condensate is brought in by conduits 24 and 25 and sprayed as a fine mist into the chamber. The condensate flow rate is controlled so that a predetermined part of the friction heat/superheat of the steam from the compressor is transformed into heat of evaporation of the condensate by direct contact, thereby reducing the superheat to a desired level and increasing the ejecting steam outflow from the chamber by the mass flow rate of condensate delivered thereto. As an alternative, de-superheating chamber 21' can be eliminated and the condensate sprayed into compressor 20 at many points arranged on the shell (not shown).

Furthermore, second compressor 40 is adjusted to generate superheated steam of ejecting pressure, and its output steam conduit 41 (of FIGS. 1 and 2) is replaced by conduit 42, which transfers the superheated steam into a second de-superheating chamber 43. In chamber 43 the steam is partly de-superheated in the same manner as in chamber 21' by means of condensate delivered by conduits 24 and 44, and the enhanced quantity of at least partly de-superheated steam is then routed via conduits 47 and 22 to ejector 13.

Finally, in Version C, exhaust boiler 33 is adjusted to generate superheated steam of ejecting pressure and ejecting enthalpy and its output steam conduit 35 is replaced by conduit 48, which connects the steam output to the ejector inlet.

The use of de-superheating enhances considerably the mass flow rate of available superheated ejecting steam. In an average working case, the flow rate may be increased by roughly up to 70%, which implies that the compressing equipment necessary for the generation of a specific ejecting steam flow rate can be reduced in size correspondingly.

Preferably, the condensate used for de-superheating should be preheated by the engine body cooling system (not shown) up to the system's maximal temperature, so that the ejecting steam flow exiting from the de-superheating chamber may be enhanced further and so that the flash-evaporation/vapor-compression operation of the engine body cooling system may be reduced in size.

Alternatively, the recompressed steam exiting from at least one compressor may be made to possess already the desired parameters, without any de-superheating, by choosing an appropriate compression ratio, so that at least one de-superheating chamber can be eliminated.

It is not necessary that each of the above mentioned thermal steam generating sources produces steam of exactly the ejecting pressure and exactly the ejecting enthalpy, but it is important that the final ejecting steam mix from all sources together will possess the desired predetermined parameters.

In contrast to the recompressed ejecting steam, the ejecting steam generated thermally by the superheat/friction-heat/reject heat recovery operation is condensed together with the evacuated vapor, and its condensate is continuously recycled. Thereby, the compressor/prime mover assemblage will be reduced in size in linear relation to the proportion of recompressed to thermally generated ejecting steam.

So far in the description of Version C, the superheat content is adjusted to a level that will permit an appropriate reduction of the ejecting steam pressure to a level that results in at least the same kinetic energy transfer in ejector 13 as in an analogous operation using saturated steam.

However, in many situations it is preferred to operate with a higher superheat level because this enables the achievement of a higher exhaust pressure from ejector 13, and thus a higher intake pressure into compressor 20.

Figure 4:
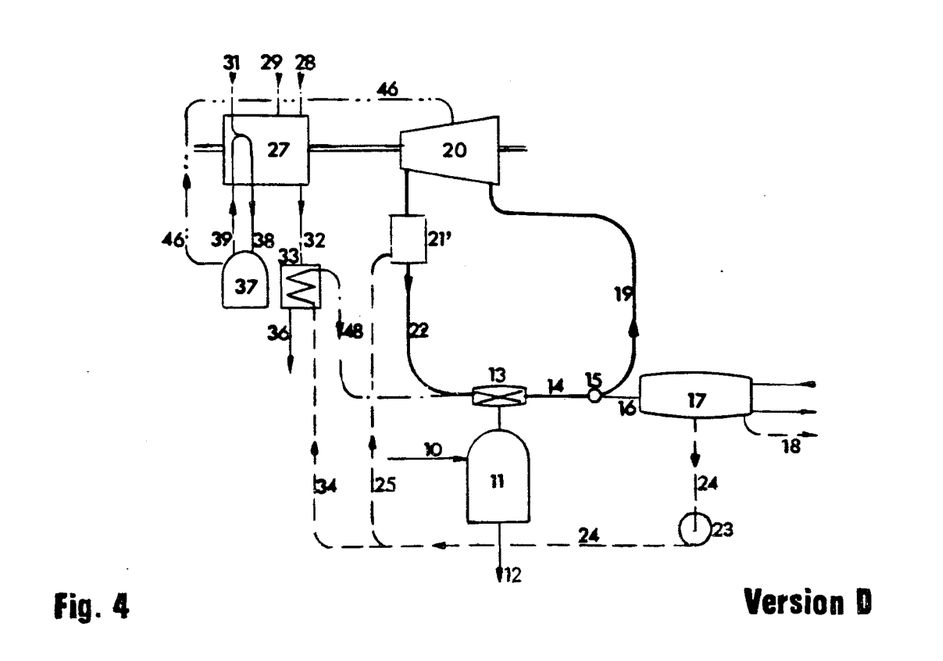
FIG. 4 is a schematic diagram of Version D of the invention, which operates similarly to Version C but eliminates the second compressor of Version C and incorporates its compression work into the main compressor, so that only one compressor is required.

In FIG. 4, which illustrates Version D and which represents the most advanced embodiment of the invention, the operation of Version C is repeated, but the vapor from flash evaporation chamber 37 is introduced by alternate route 46 into main compressor 20 at a point where the pressure attained in the main compressor equals the predetermined under-pressure in flash evaporation chamber 37. A fan or impeller (not shown), located in conduit 46, may assist the transfer of the vapor. This alternative eliminates not only second compressor 40 but also second de-superheating 43 and conduits 42, 44, and 47.

Quite arbitrarily, only four Versions were chosen to illustrate the invention. However, many of the properties and features of the various versions are interchangeable to a certain degree, so that many other combinations may be obtained for changed situations and conditions. It will be understood that many modifications can be made, especially in regard to parameters, specifications and layout without departing from the scope of the invention.

In addition, in practice the method may use multi-stage compression, ejection and/or flash evaporation in all instances where single stage operation has been indicated to simplify the description.

In all Versions the apparatus, including all fixtures and conduits, should be well insulated to eliminate as far as possible the escape of heat.

EXAMPLE

In the following example the comparable fuel efficiencies (thermal efficiency) of Versions B and C are calculated and compared with the prior art. The same assumptions as in the example of prior art given in the Background of the Invention (ejecting steam pressure at 2 bars, condensation at 33° C., enthalpy drop during expansion equals 34 kcal/kg) are used, to permit comparison of the processes. Assuming further the overall efficiency of a diesel engine to be 0.40, the mechanical efficiency of the two turbo-compressors to be 0.90, the loss of heat in the system including operation of auxiliaries to be 10% of the total thermal input, the hot engine cooling water to be flash evaporated down to 90° C. and then compressed to steam of 2 bars (the compression to be carried out in small stages of not more than doubling the pressure of the former stage), the concise calculation of the thermal input per flow rate of 1 kg of recompressed ejecting steam defined in kilocalories as a common denominator, is as follows:

The thermal equivalent of the total fuel input into the process amounts to the sum of the two enthalpy drops which are overcome during compression (34 and 3 kcal/kg) plus the superheat generated in both compressors during the raising of the two steam inputs to the ejection pressure (125 and 10 kcal/kg, as calculated separately) divided by the product of the efficiency rate of the engine (0.40) times the mechanical efficiency of the compressors (0.90) times the thermal efficiency of the system (0.90). This results in a gross thermal input of 531 kcal per flow rate of one kilogram of recompressed ejecting steam.

Out of this gross thermal input only the system's heat loss (10% = 53 kcal) represents an actual loss, since the reject heat of the engine is recovered fully (minus 10%, which forms a proportional part of the system's total thermal loss). The same is true for the friction heat generated in the compressor. The net thermal input (531−53=478 kcal) is utilized to make up the enthalpy drop during the expansion of the ejecting steam (646−612=34 kcal/kg), and the remainder (478−34=444 kcal) generates steam of 2 bar pressure by heating the 33° C. condensate and converting it to steam of a specific enthalpy of 646 kcal/kg.

Since 613 kcal (646−33=613) are required per 1 kg steam, this amounts to an output of 444/613=0.72 kg steam obtained from the reject heat/friction heat/superheat employing operation in addition to each kilogram of steam gained by direct recompression. Hence, a total of 1.72 kg of steam is generated by means of a total thermal input of 531 kcal.

The gross thermal investment in the generation of ejecting steam for Version B thus amounts to 38 kcal/kg (34/0.9=38), which comes to roughly 5.58% (38/6.81=5.58%) of the analogous thermal investment in prior art fuel-fired ejecting steam generating boiler systems, while the 444 kcal transferred as net output heat are thermally not more expensive than the heat otherwise generated in an efficient boiler, since the actual heat losses are practically equal in both processes (444/0.9=493 kcal).

Supposing that Version C, wherein the otherwise output steam is instead used within the system as additional ejecting steam, employs saturated ejecting steam of 2.0 bar pressure, the gross specific thermal investment averages 308 kcal/kg (531/1.72=308). This amounts to roughly 45.2% (308/681=0.452) of the gross thermal investment in the prior art system.

In Version A the thermal expenditure to recompress the ejecting steam is as in Version B, while the total fuel input is somewhat smaller, because there is no additional compression work to be carried out to convert the engine cooling water into steam. On the other hand, the temperature of part of the heat output is correspondingly lower.

What is claimed is:

1. In combination with a process employing steam ejection that includes inflowing an aqueous substance into a flash evaporation means for vaporizing water from the substance, discharging the substance remaining after said vaporization, supplying ejecting steam at a first pressure and a first enthalpy level to ejector means operatively connected to the flash evaporating means for creating and maintaining an under-pressure in said flash evaporation means and for evacuating and subsequently thermo-compressing the vaporized water from the flash evaporation means to a second pressure and second enthalpy level lower than the respective first pressure and first enthalpy level, a method for the continuous regeneration of ejecting steam, the method comprising:
   (a) employing a predetermined quantity of ejecting steam in a returning conduit including said ejector means;
   (b) expanding said ejecting steam in said ejector means to said second pressure and second enthalpy level;
   (c) recompressing said expanded ejecting steam with mechanical compression means to its initial first pressure, and an enthalpy level at least equal to said first enthalpy level;
   (d) repeating steps (b) and (c) in a continuous cycle, whereby the predetermined quantity of ejecting steam is continuously regenerated without condensing it and without using a boiler to regenerate it;
   (e) branching off from the flow of steam/vapor mix exiting from the ejector means that part of the flow which is in excess of the initial recompressed ejecting steam flow, leaving thereby the predetermined quantity of ejecting steam flow for the continuous implementation of steps (b) and (c); and
   (f) condensing the branched-off flow.

2. The method of claim 1 wherein said first enthalpy level corresponds to a predetermined value of superheat at the first pressure.

3. The method of claim 1 further comprising:
   (g) extracting sufficient superheat and friction heat generated during the mechanical recompression of the ejecting steam to reduce the enthalpy of the predetermined quantity of steam after step (c) to the first enthalpy level and thereby establishing a first output source of heat.

4. The method of claim 3 wherein step (g) comprises directing a part of the condensed branched-off flow from step (f) into heat transfer relation with the recompressed ejection steam across a heat transfer surface.

5. The method of claim 4 wherein a part of the condensed branched-off flow is brought into heat transfer relation with the recompressed ejection steam after step (c).

6. The method of claim 5 wherein only a part of the superheat of the ejecting steam is extracted, whereby the ejecting steam is delivered to the steam inlet of the ejector means with a predetermined amount of superheat.

7. The method of claim 3 wherein step (g) comprises directing a part of the condensed branched-off flow from step (f) into direct contact with the recompressed ejection steam in a de-superheating means, evaporating said part of the condensed branched-off flow from step (f) into steam at said first pressure and first enthalpy level and adding said evaporated steam to the predetermined amount of recompressed ejection steam prior to entering the steam inlet of the ejector means.

8. The method of claim 3 further comprising:
   (h) driving the mechanical compression means with a heat engine and
   (i) retrieving the reject heat of the heat engine's cooling system at maximal temperature, thereby establishing a second output source of heat.

9. The method of claim 8 wherein step (i) comprises flowing cooling water at maximal temperature from the heat engine into a flash evaporation means, evaporating a part of the cooling water in the flash evaporation means, returning the remainder of the cooled cooling water to the heat engine, and mechanically compressing the evaporated part of the cooling water to generate steam at a predetermined pressure.

10. The method of claim 9 wherein the step of mechanically compressing the evaporated part of the cooling water generates superheated steam, and the method further comprises delivering the superheated output steam to a de-superheating means, directing a part of the condensed branched-off flow from step (f) into direct contact with the compressed evaporated part of the cooling water in the de-superheating means, evaporating said part of the condensed branched-off flow through transfer of superheat and friction heat generated in the compressed output steam during the mechanical compression step, thereby generating a mixture of the evaporated part of condensate from step (f) and de-superheated output steam to form said second output source of heat.

11. The method of claim 10 wherein the evaporated part of the cooling water is compressed to said first pressure and an enthalpy level higher than said first enthalpy level prior to delivery to the de-superheating means, the method further comprising adding the steam forming said second output source of heat to the recycled ejection steam prior to entering the steam inlet of the ejector means.

12. The method of claim 8 further comprising:
   (j) recovering the waste heat contained in the heat engine's exhaust gases by means of an exhaust boiler, thereby establishing a third output source of heat.

13. The method of claim 12 wherein step (j) comprises directing a part of the condensed branched-off flow from step (f) into heat transfer relation with the heat engine's exhaust gases in said exhaust boiler to generate steam at a predetermined pressure to form said third output source of heat.

14. The method of claim 13 wherein the predetermined pressure of the steam generated in the exhaust boiler is equal to said first pressure, the method further comprising adding the steam forming said third output source of heat to the predetermined amount of recycled ejection steam prior to entering the steam inlet of the ejector means.

15. In combination with a system employing steam ejection, the system including a flash evaporation means for vaporizing water from an aqueous process substance, the flash evaporation means having an inlet for an aqueous process substance, a first outlet for water vapor evaporated from the process substance and a second outlet for discharging the remainder of the process substance, and an ejector means for creating and maintaining an under-pressure in said flash evaporation means and for evacuating and subsequently thermo-compressing the vaporized water from the flash evaporating means, the ejector means having an ejecting steam inlet, an evacuated vapor inlet connected to the first outlet of the flash evaporation means, and an outlet for the mixture of exhausted steam and thermo-compressed evacuated vapor, apparatus for continuously regenerating ejecting steam employed in said system, the apparatus comprising:

(a) conduit means connected in a returning loop between the outlet of the ejector means and the ejecting steam inlet of the ejector means for circulating a predetermined quantity of ejecting steam in one direction between an initial pressure level before ejection and an exhaust pressure level, the ejector means being located at a pressure drop zone in the ejecting steam loop between the two pressure levels;

(b) distribution means placed in the conduit means downstream from the outlet of the ejector means for dividing the exhausted steam/evacuated vapor flow into two streams, the first composing the predetermined quantity of circulating ejecting steam and the second composing the remainder of the flow from the outlet of the ejector means;

(c) mechanical compressor means located at a pressure increase zone in the ejecting steam loop between the two pressure levels for recompressing said first stream to its initial pressure before ejection; and (d) condenser means connected to the dividing means for condensing the vapor in the second flow.

16. The apparatus of claim 15 comprising:

(e) heat exchange means placed in the conduit means downstream from the compressor means for transferring superheat and friction heat generated in the first stream during mechanical compression into a heat carrier in heat transfer relationship with the outside, thereby constituting a first output source of heat.

17. The apparatus of claim 16 wherein said heat exchange means comprises a surface type of heat exchanger, and the apparatus further comprises a pump means having an inlet connected to the condenser and an outlet connected to the heat exchanger for pumping condensed vapor at a predetermined pressure and mass flow rate from the condenser to the heat exchanger to serve as said heat carrier.

18. The apparatus of claim 17 wherein the heat exchange means comprises a counterflow heat exchanger.

19. The apparatus of claim 16 wherein the heat exchange means comprises a de-superheater means, and the apparatus further comprises a pump means having an inlet connected to the condenser and an outlet connected to the de-superheater means for pumping condensed vapor at a predetermined pressure approximately equal to the first pressure from the condenser to the de-superheater means for contacting directly the predetermined amount of recycled ejecting steam and extracting therefrom superheat and friction heat generated by the compressor.

20. The apparatus of claim 16 comprising:
(f) prime mover means embodied by a heat engine for driving the compressor means and
(g) retrieval means for the reject heat of the heat engine's cooling system in heat exchange relationship with the outside via a returning cycle, thereby constituting a second output source of heat.

21. The apparatus of claim 20 wherein the retrieval means for the reject heat of the heat engine's cooling system comprises an inlet for cooling water to the engine; an outlet for heated cooling water from the engine; flash evaporation means having an inlet connected to the cooling water outlet from the engine, a liquid outlet connected to the cooling water inlet of the engine, and a vapor outlet; a second mechanical compressor means operatively coupled to the engine and having an inlet connected to the vapor outlet of the flash evaporation means and an outlet for compressed steam, the compressor being driven by the engine to evacuate water vapor that has been flash evaporated from said heated cooling water in the flash evaporation means and to compress said evacuated flashed vapor to superheated steam at the outlet of the second compressor means.

22. The apparatus of claim 21 wherein the second compressor means comprises a stage of said mechanical compressor means (c).

23. The apparatus of claim 21 wherein the second compressor means comprises a final stage of said mechanical compressor means (c).

24. The apparatus of claim 21 further comprising de-superheating means having a superheated steam inlet connected to the outlet of the second compressor means, a condensate inlet connected to the condensate pumping means for delivering a part of the condensed vapor from the condenser for extracting superheat and friction heat generated in the evaporated cooling water in the second compressor means, and a steam outlet connected to the steam inlet of the ejector means for delivering steam from the flash evaporation means as additional ejecting steam.

25. The apparatus of claim 20 comprising:
(h) exhaust boiler means for the retrieval of the waste heat contained in the exhaust gases of said heat engine, thereby constituting a third output source of heat.

26. The apparatus of claim 25 comprising a conduit connecting the outlet of the condensate pumping means to the exhaust boiler means for delivering condensate from the condenser to the exhaust boiler at approximately said first pressure and a conduit connecting the exhaust boiler means to the steam inlet of the ejector means for delivering steam generated in the exhaust boiler means as additional ejecting steam.

* * * * *